Sept. 15, 1953        L. L. THOMAS        2,651,967
MOTION-PICTURE PROJECTOR CABINET
Filed May 22, 1950        2 Sheets-Sheet 1
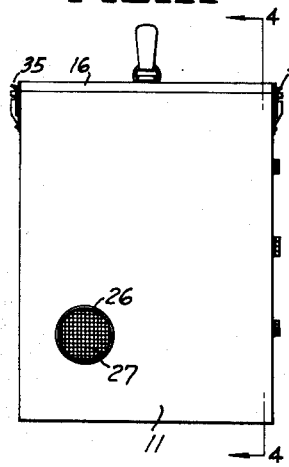
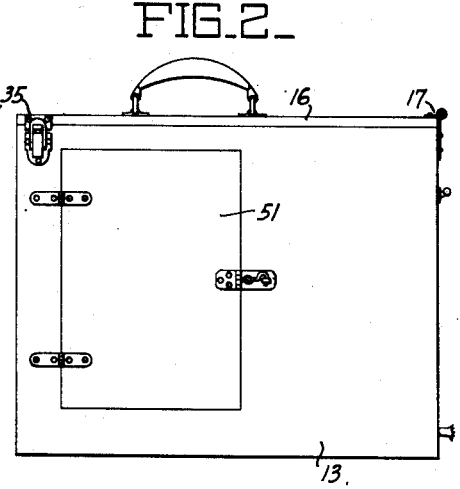
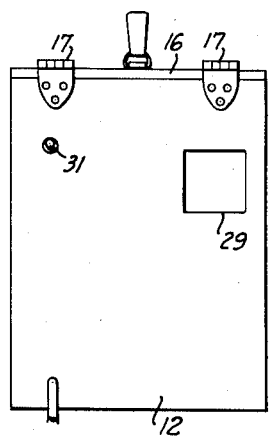
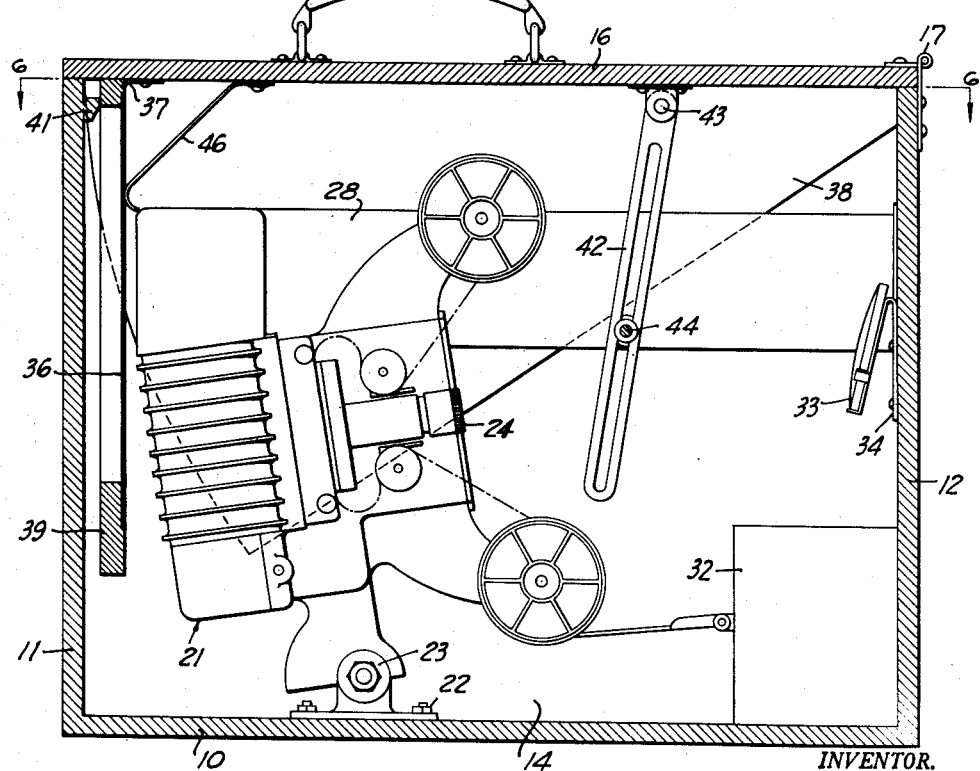
INVENTOR.
Leonard L. Thomas
BY
ATTORNEYS

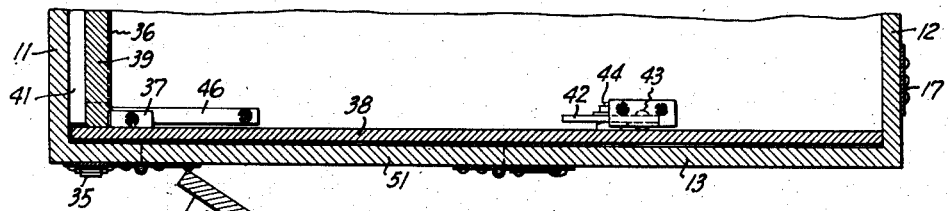
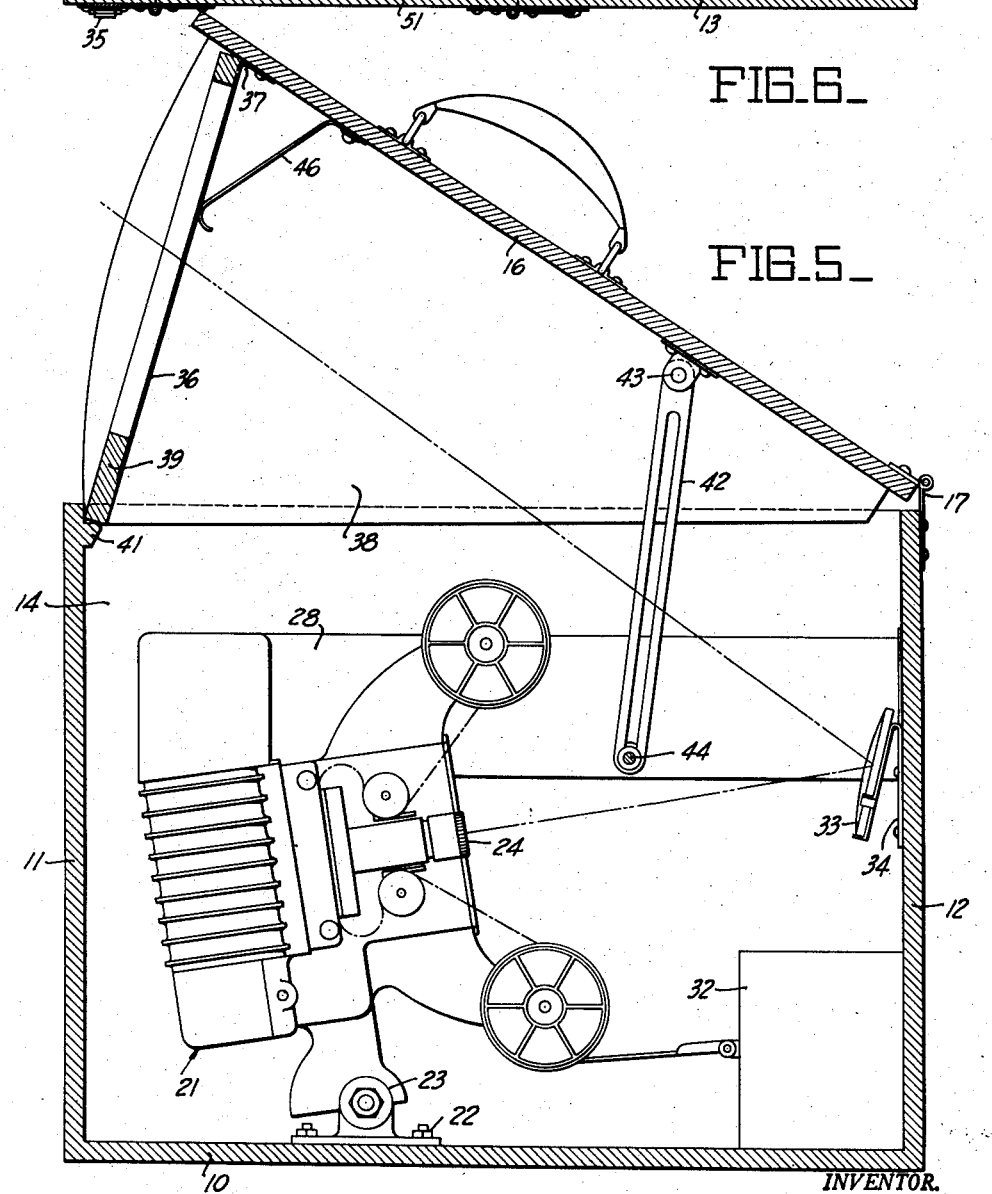

Patented Sept. 15, 1953

2,651,967

UNITED STATES PATENT OFFICE 2,651,967

MOTION-PICTURE PROJECTOR CABINET

Leonard L. Thomas, Sacramento, Calif.

Application May 22, 1950, Serial No. 163,377

2 Claims. (Cl. 88—24)

This invention relates to cabinets for motion picture projectors and particularly to that type of cabinet which is adapted to form a case for the projector and to provide a screen upon which the motion picture may be projected.

As is known to those skilled in the art, most motion pictures are projected from a projector to a screen upon which the pictures are viewed. The size of the picture depends in most cases upon two factors; the lens through which the picture is projected and the distance of the lens from the screen.

It is an object of this invention to provide a cabinet within which a motion picture projector may be mounted, together with all of its component parts, and as a component of which a viewing screen may be provided.

It is a further object of this invention to provide a device of this character which is of relatively small dimension and in which the distance between the lens and the screen may be reduced to a minimum.

Other objects and advantages of this invention will appear from the following specification taken in conjunction with the accompanying drawings in which:

Figure 1 is a front elevational view of a cabinet employing my invention;

Figure 2 is a side elevational view of the cabinet shown in Figure 1;

Figure 3 is an end elevational view of the cabinet;

Figure 4 is an enlarged cross-sectional view taken along the line 4—4 of Figure 1, with the cabinet in closed position;

Figure 5 is an enlarged cross-sectional view as illustrated in Figure 4 with the cabinet in open position; and Figure 6 is a fragmentary cross-sectional view taken along the line 6—6 of Figure 4.

As illustrated in Figures 1, 2, 3 and 4 my cabinet consists of a closed box composed of a stationary bottom wall 10, end walls 11 and 12, and side walls 13 and 14. The top 16 is hingedly secured at one end to end wall 12 by a pair of hinges 17.

A motion picture projector 21 is secured to the bottom wall 10 in any suitable manner as, for example, by bolts 22 and is spaced from the end wall 11 substantially as shown in Figure 4. The purpose of this spacing will be more fully hereinafter explained. The projector 21 is substantially conventional and may be of any suitable make provided, however, that it is sufficiently small to fit within the cabinet provided. As illustrated. it is provided with a tilting adjustment 23 whereby it may be tilted, as shown in Figures 4 and 5. The picture is projected from the lens 24 toward the end wall 12.

End wall 11 is provided with a circular orifice 26 which is provided with a suitable guard screen 27 through which air may be introduced or drawn into the cabinet for cooling purposes as, it will be recalled, considerable heat is generated by the lamp within the machine 21. An outlet manifold 28 is provided to draw off the warm air from the machine 21. The manifold 28 exhausts the warm air through a port 29 in the end wall 12.

The means for controlling the operation of the projector 21 are substantially conventional and will not further hereinafter be described. It will be sufficient to say that the machine may be started, stopped or reversed at will as, for example, by operation of the switch 31 and the various control devices 32.

On the inner side of the end wall 12, there is provided a parabolic reflector 33 which is secured to the end wall 12 by a bracket 34. The parabolic reflector 33 is spaced apart from and set at an angle with respect to the end wall 12 for a purpose more fully hereinafter to be described.

As is particularly illustrated in Figures 4 and 5, top wall 16 of the cabinet is hingedly secured by means of hinges 17 to the end wall 12. As shown in Figure 4, the top wall 16 is in closed position. It is usually retained in this position by the snap latches 35. However, upon release of the latches 35, the top 16 may be swung upwardly as indicated in Figure 5.

A viewing screen 36 is hingedly secured to the lower side of the top 16 by means of a spring hinge connection 37 and may be made of any suitable screen material upon which a picture may be shown. The picture is projected onto the inner surface of the screen 36 but is viewed upon the outer surface of the screen 36.

Also secured to the lower side of the top 16, there is a pair of arcuately shaped inner wall members 38 which lie adjacent to the interior of the side walls 13 and 14. The walls 38 are of sufficient depth that when the top 16 is swung upwardly, as viewed in Figure 5, the lower edges of the walls 38 still project downwardly into the cabinet, forming in effect upward extensions of the side walls 13 and 14, thereby preventing light from entering the cabinet.

The lower edge of the frame 39 surrounding the screen 36 is adapted to engage a ledge 41 on the interior of the wall 11. When the top is in elevated position, as shown in Figure 5, the ledge 41 forms a support for the top 16 and the screen 36. Unlimited upward movement of the top 16 is prevented by a swinging device 42 which is hingedly secured at one end to the top 16 by a hinge 43 and which, at its lower end, rides upon a pin 44 secured to the wall 13. A spring 46 urges the screen 36 to the position shown in Figure 5.

As has previously been pointed out, the projector 21 is spaced apart from the wall 11 in order to provide a space for the screen 36 when the cabinet is in closed position, as indicated in Figure 4.

The parabolic reflector 33 is set at a predetermined angle with respect to the wall 12 whereby a picture projected upon the parabolic reflector 33 will be reflected upwardly to the screen 36 from which it may be viewed. By the use of the parabolic reflector, the image which is projected upon the mirror from the machine 21 is enlarged. This permits the use of a small distance between the projector and the screen 36 which cannot otherwise be had where the reflecting device is not of the parabolic type.

Operation and use of the device may briefly be described as follows: When the device is in closed position, as indicated in Figures 1, 2, 3 and 4, it may be transported from place to place readily in any conventional manner. It will be noted that the projector 21, the reflector 33 and the screen 36 are all contained within the cabinet and are available for use when desired. However, when the device is in the closed position, as shown in Figures 1, 2, 3 and 4, the motion picture may not be viewed upon the screen 36. When it is desired that the device be utilized, the clasps 35 are swung outwardly and the top 16 swung about the hinge 17, generally to the position as illustrated in Figure 5. The screen 36 is thus elevated until the frame 39 engages the upper edge of the stop 41. Further upward movement of the top 16 and the screen 36 is prevented by the engagement of the member 42 and the pin 44. The side walls 38 which, it will be recalled, are secured to the lower side of the top 16 will have swung upwardly to a position generally as shown in Figure 5 at which position their lower edges still remain within the cabinet formed by the side and end walls 11, 12, 13 and 14. This, in effect, maintains a totally closed cabinet. However, the entire screen 36 is exposed for viewing. The projector 21 may be connected to any suitable source of electric current and operated in any conventional manner through the switch 31 and the other controls 32. The picture is projected from the lens 24 to the parabolic reflector 33.

By virtue of the positioning of the parabolic reflector 33, the image will be reflected to the screen 36. By virtue of the parabolic reflecting surface of the reflector 33, the image will be "expanded" or increased in size as it is reflected. The utilization of the parabolic reflector 33 permits a shorter focal length between the projector lens 24 and the screen 36 than would be possible with a conventional nonparabolic reflector.

A door 51 in the wall 13 is provided for ready access to the projector 21.

It will be obvious, therefore, that I have provided a compact yet complete cabinet for a motion picture projector and the entire apparatus is considerably smaller than the conventional type of device of this character. By providing a parabolic reflector 33, I have decreased the overall length previously required in such devices without in any way affecting the character of the picture reflected upon the screen 36 other than to increase its size.

It will be apparent that this cabinet may also be utilized with a larger external screen by the removal of the screen 36 which is illustrated herein. Removal of the screen 36 will provide an aperture of the same size as the screen through which the picture being shown will be reflected by the parabolic reflector 33. A screen may be placed at any point in the path of the image so projected.

I claim:

1. In a motion picture projector cabinet, an enclosed cabinet provided with a hinged top movable between open and closed positions, a screen mounted on said top, said screen being retained entirely within said cabinet when said top is closed and being entirely exposed when said top is open, a pair of arcuately shaped portions depending from said top adjacent the side edges of said top and adapted to form extensions of the sides of said cabinet when said top is in raised position, a motion picture projector within said cabinet, a parabolic reflector within said cabinet, said projector and said parabolic reflector being so positioned that a picture projected from said projector to said parabolic reflector will be reflected and enlarged by said reflector upon said screen when said screen is in raised position, and a lip adjacent the inner edge of that end wall adjacent the screen and adapted to be engaged by the lower edge of said screen when the same is in elevated position to retain the same in proper predetermined elevated position.

2. In a motion picture projector cabinet, an enclosed cabinet provided with a hinged top movable between open and closed positions, a screen mounted on said top, said screen being retained entirely within said cabinet when said top is closed and being entirely exposed when said top is open, a pair of arcuately shaped portions depending from said top adjacent the side edges of said top and adapted to form extensions of the sides of said cabinet when said top is in raised position, a motion picture projector within said cabinet, a parabolic reflector within said cabinet, said projector and said parabolic reflector being so positioned that a picture projected from said projector to said parabolic reflector will be reflected and enlarged by said reflector upon said screen when said screen is in raised position, means for retaining said screen in proper raised position, said means comprising a lip upon which the lower edge of said screen may rest, and resilient spring means for urging said screen into position adjacent said lip.

LEONARD L. THOMAS.

References Cited in the file of this patent

UNITED STATES PATENTS

| Number | Name | Date |
|---|---|---|
| 2,320,760 | Surre | June 1, 1943 |
| 2,322,023 | Hopkins | June 15, 1943 |
| 2,438,022 | Rundle | Mar. 16, 1948 |